(12) United States Patent
Wen

(10) Patent No.: US 8,777,038 B2
(45) Date of Patent: Jul. 15, 2014

(54) AIR RELIEF VALVE STRUCTURE OF PRESSURE COOKER

(71) Applicant: Zao An Co., Ltd., Hualien (TW)

(72) Inventor: Chia-Heng Wen, Hualien (TW)

(73) Assignee: Zao An Co., Ltd., Hualien (TW)

( * ) Notice: Subject to any disclaimer, the term of this patent is extended or adjusted under 35 U.S.C. 154(b) by 0 days.

(21) Appl. No.: 13/786,577

(22) Filed: Mar. 6, 2013

(65) Prior Publication Data

US 2014/0076892 A1 Mar. 20, 2014

(30) Foreign Application Priority Data

Sep. 20, 2012 (TW) .................................. 10121878

(51) Int. Cl.
*F16K 17/38* (2006.01)
*F16K 17/36* (2006.01)
*A47J 27/092* (2006.01)
*A47J 27/09* (2006.01)

(52) U.S. Cl.
CPC ............... *F16K 17/38* (2013.01); *A47J 27/092* (2013.01); *A47J 27/09* (2013.01); *F16K 17/36* (2013.01)
USPC .................... 220/89.1; 220/573.1; 220/203.2; 220/203.19

(58) Field of Classification Search
CPC ....... F16K 17/38; F16K 17/366; F16K 17/36; A47J 27/092; A47J 27/09; A47J 27/08
USPC .................. 220/89.1, 203.2, 203.19, 203.27, 220/203.23, 573.1, 912
See application file for complete search history.

(56) References Cited

U.S. PATENT DOCUMENTS 2,385,594 A * 9/1945 Witte, Jr. ..................... 126/384.1

* cited by examiner

*Primary Examiner* — Robert J Hicks
(74) *Attorney, Agent, or Firm* — Alan Kamrath; Kamrath IP Lawfirm, P.A.

(57) ABSTRACT

In an air relief valve structure of a pressure cooker, the pressure cooker includes a cooker body and a lid. The lid has a containing trough and an air relief valve. The air relief valve includes a middle column, an airtight column, an elastic element and a gravity valve. The middle column has a containing space and air relief and through holes formed on an outer wall of the middle column and interconnected with the containing space. In the containing space, an airtight column is installed. An end column is defined at an end of the airtight column and is disposed adjacent to an inner wall of the middle column, and the end column has a diameter equal to the diameter of the containing space of the middle column. The air relief hole allows food material to be discharged easily to reduce pressure and enhance the overall safety of the pressure cooker.

3 Claims, 5 Drawing Sheets

AIR RELIEF VALVE STRUCTURE OF PRESSURE COOKER

BACKGROUND OF THE INVENTION

1. Field of the Invention

The present invention relates to an air relief valve and, in particular, to an air relief valve structure of a pressure cooker that allows food materials to be discharged from an air relief hole to prevent the food material from clogging the pressure cooker and reducing the relief pressure of the pressure cooker.

2. Description of the Prior Art

As civilization, science and technology advance, various modern products are introduced into our life. As to dining, people cooked rice and food by burning wood in the past, and started using products such as electronic cookers or electric cookers after electricity and gas are invented or discovered. However, some still use gas for cooking rice or other food. However, the oil price keeps increasing recently, and the price of some of the daily necessary materials also increases. Of course, these daily necessary materials also include the indispensable resources or energies such as water, electricity and gas. When the aforementioned resources or energies are used, the power saving issue is also taken into consideration to save costs and family expenses. In the age of an increased price of daily necessities and energies, related manufacturers spare no effort to develop products with the features of power saving and carbon reduction and of overcoming environmental issues. Among the aforementioned cooking devices, the electric cookers and electronic cookers for cooking food and rice are necessary electric appliances. The longer the cooking time, the greater the energy consumption. Therefore, it is a main subject for related manufacturers to develop a cooking device that can cook food or rice quickly.

Pressure cookers available in the market can overcome the aforementioned problem. The basic structure of a general pressure cooker includes a steel airtight container combined with a pressure relief valve. At a higher pressure, the boiling point of liquid increases. Based on this physical phenomenon, the pressure cooker can apply pressure to water, such that the water can reach a higher temperature without boiling to expedite the cooking of food, to achieve the effect of saving time and energy.

However, most conventional pressure relief valves used in a pressure cooker can be used simply for discharging gas to reduce the pressure in the pressure cooker. If the air relief hole is clogged by food materials, then, the purpose of relieving pressure cannot be achieved quickly and effectively. The pressure relief valve fails to discharge gas quickly and effectively mainly due to the too-small air relief hole. As a result, a small amount of food debris may occupy the whole pressure relief space easily and cause the failure of relieving the pressure.

SUMMARY OF THE INVENTION

Therefore, it is a primary objective of the present invention to provide an air relief valve structure of a pressure cooker that allows food materials to be discharged from an air relief hole to prevent the food material from clogging the pressure cooker and reducing the relief pressure of the pressure cooker.

To achieve the aforementioned objective, the present invention provides an air relief valve structure of a pressure cooker, and the pressure cooker comprises a cooker body and a lid covered onto the top of the cooker body. The lid has a containing trough, and the air relief valve is installed at the containing trough. The air relief valve includes a middle column having a containing space formed in the middle column and at least one air relief hole and a through hole on an outer wall of the middle column and interconnected to the containing space. An airtight column is installed in the middle column, and has an end column defined at an end of the airtight column and disposed adjacent to an inner wall of the middle column. The end column has a diameter equal to the diameter of the containing space of the middle column. An elastic element is sheathed on the airtight column and abuts the end column. A gravity valve is installed at the top of the middle column and is coupled to the airtight column.

According to a preferred embodiment of the present invention, the air relief valve structure of a pressure cooker further comprises a rubber ring sheathed on the end column and abutted against an inner wall of the middle column.

According to a preferred embodiment of the present invention, the gravity valve has a bevel defined on an inner wall of the gravity valve, with a buffer portion extended inwardly from an end of the gravity valve.

Another objective of the present invention is to discharge food debris quickly by an air relief hole with a greater diameter to achieve the effect of relieving pressure quickly.

A further objective of the present invention is to achieve the safety effect by simply using one air relief valve.

DESCRIPTION OF THE PREFERRED EMBODIMENTS

Figure 1:
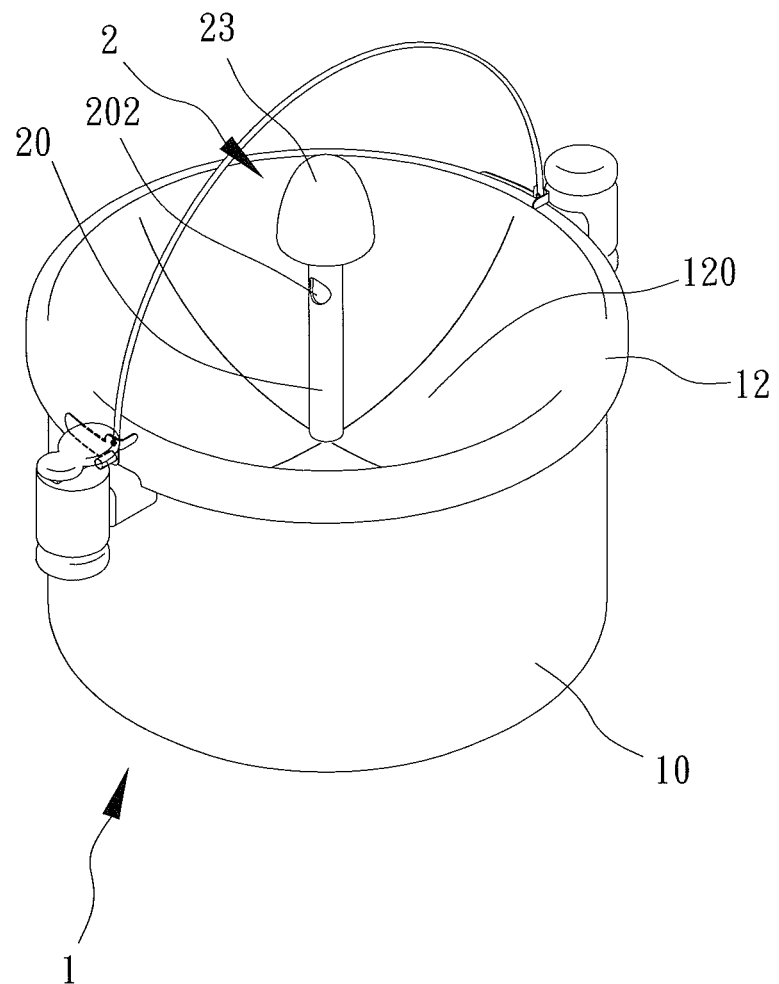
FIG. 1 is a perspective view of an air relief valve installed to a pressure cooker in accordance with a preferred embodiment of the present invention.
Figure 2:
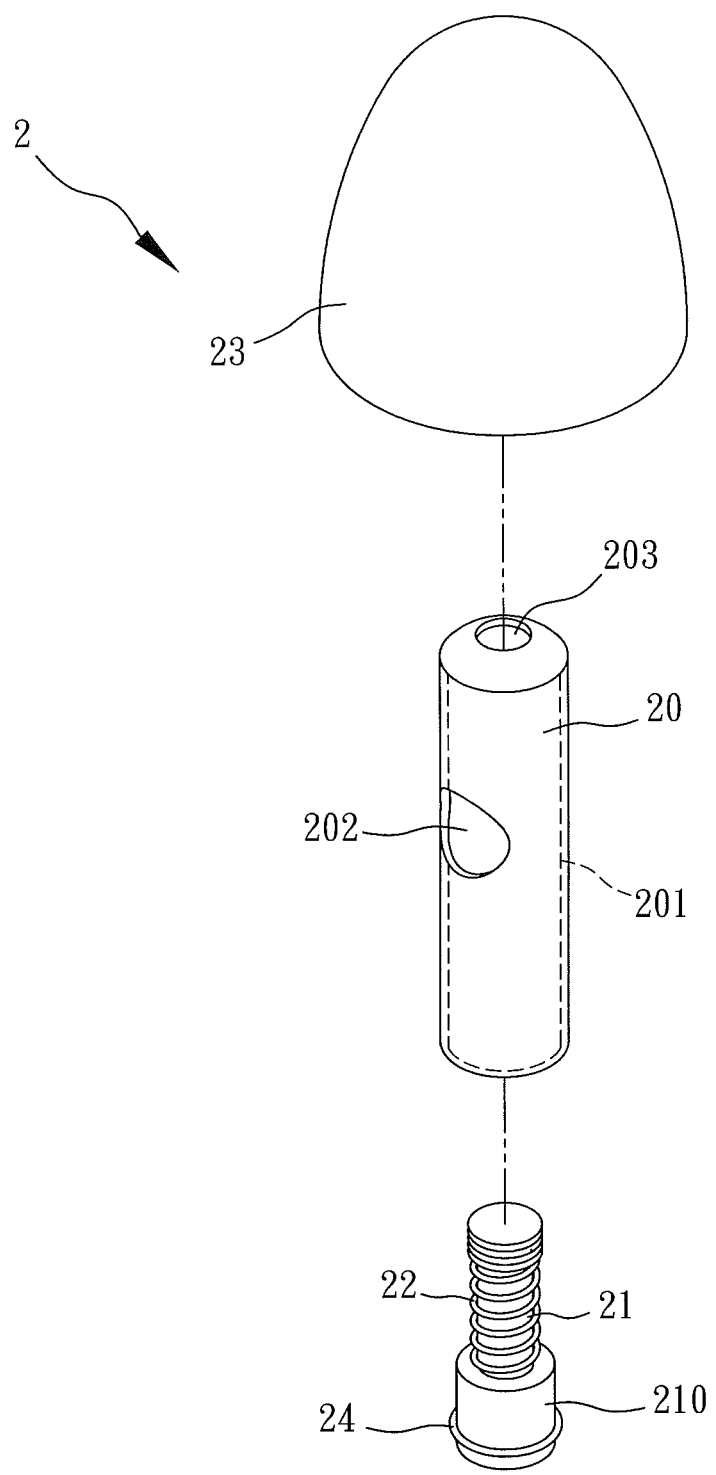
FIG. 2 is an exploded view of an air relief valve of the present invention.
Figure 3:
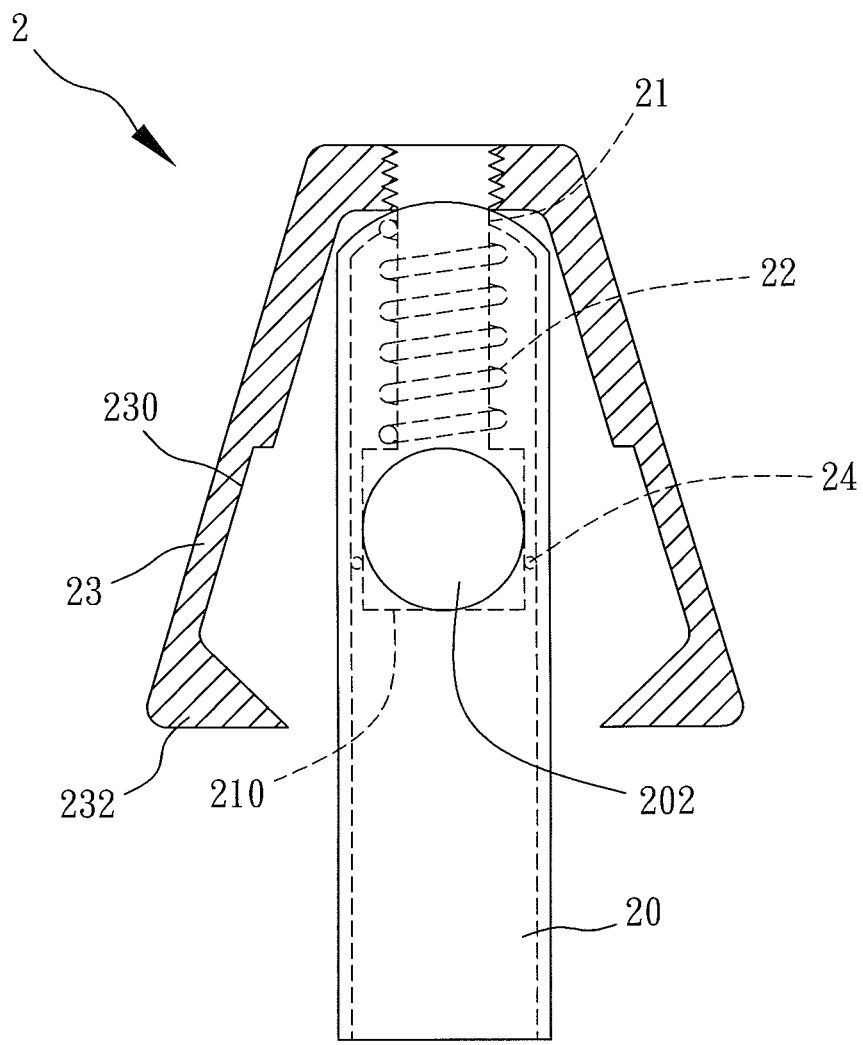
FIG. 3 is a cross-sectional view of an air relief valve of a preferred embodiment of the present invention.

With reference to FIGS. 1 to 3 for an air relief valve structure of a pressure cooker in accordance with the present invention, the pressure cooker 1 comprises a cooker body 10 and a lid 12 covered onto the top of the cooker body 10. The lid 12 has a containing trough 120 formed therein, and an air relief valve 2 is installed at the containing trough 120. The air relief valve 2 includes a middle column 20 having a containing space 201 and at least one air relief hole 202 and a through hole 203 formed on an outer wall of the middle column 20 and interconnected with the containing space 201. An airtight column 21 is installed in the containing space 201, and has an end column 210 defined at an end of the airtight column 21 and disposed adjacent to an inner wall of the middle column 20 and the other end passing through the through hole 203. The end column 210 has a diameter equal to the diameter of the containing space 201 of the middle column 20. An elastic element 22 is sheathed on the airtight column 21 and abuts against the end column 210. A gravity valve 23 is installed at a top end of the middle column 20 and is coupled to the airtight column 21. In addition, a rubber ring 24 is sheathed on the end column 210 and abuts against an inner wall of the middle column 20. A bevel 230 is defined at an inner wall of the gravity valve 23, and a buffer portion 232 is extended inwardly from an end of the gravity valve 23.

Figure 4:
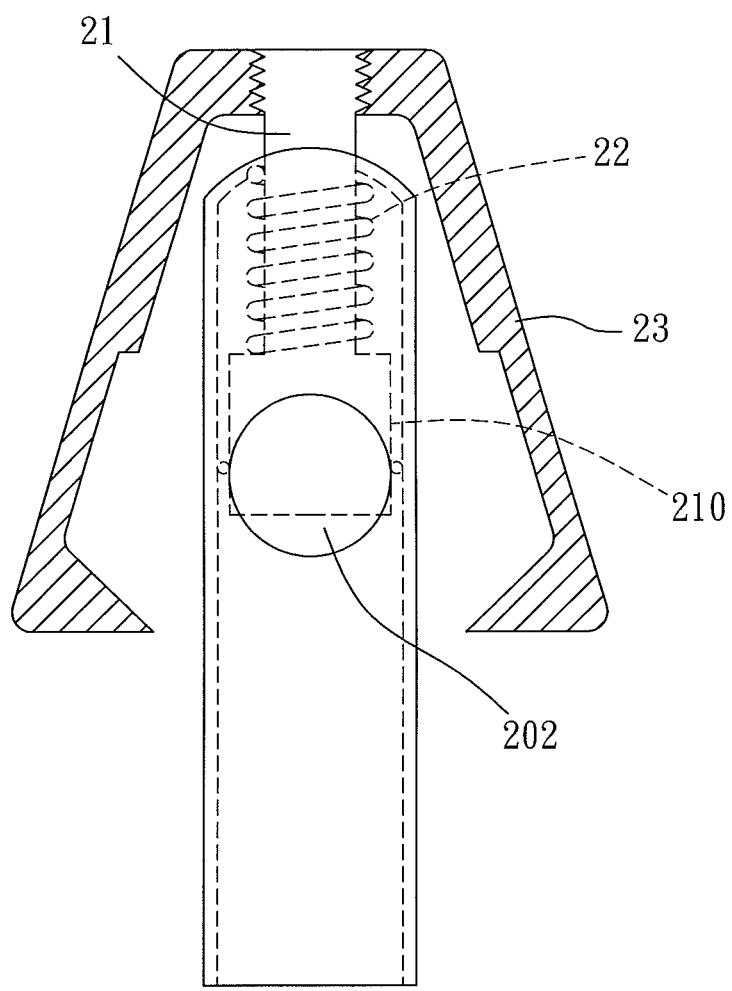
FIG. 4 is a first cross-sectional view showing an operation of an air relief valve of the present invention.
Figure 5:
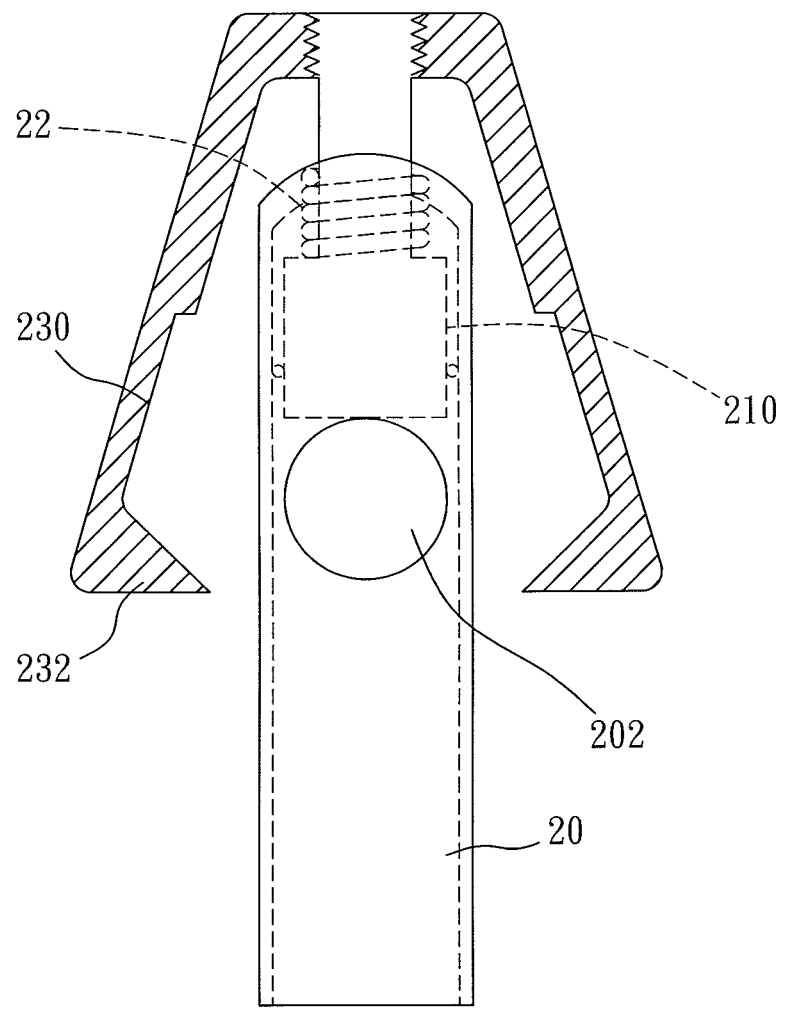
FIG. 5 is a second cross-sectional view showing an operation of an air relief valve of the present invention.

With reference to FIGS. 4 and 5, the end column 210 of the airtight column 21 will shelter the air relief hole 202 completely, if the pressure in the pressure cooker 1 (as shown in FIG. 1) is smaller than a predetermined total number of kilograms of the elastic element 22 and the gravity valve 23. The air relief hole 202 will have a gap (which is a general pressure relief mode at a normal use of the pressure cooker 1), if the pressure in the pressure cooker 1 exceeds the predetermined total number of kilograms.

On the other hand, if the pressure cooker is used improperly, food materials and an incorrect water level may result in the gap being clogged by the food debris and a rapid increase of pressure in the pressure cooker 1. Under such effect, the length of the elastic element 22 is compressed significantly. An end of the elastic element 22 abuts the end column 210, and the other end of the elastic element 22 abuts the inner wall at the top of the middle column 20. Thus, the air relief hole 202 covered by the end column 210 is exposed to discharge the clogged food material successfully. In addition, a gap is produced between the inner wall of the middle column 20 and the outer wall of the end column 210, so that the rubber ring 24 is provided for enhancing the overall sealing effect and preventing pressure leakage.

In the meantime, the pressure in the pressure cooker 1 drops rapidly, and the action force of the elastic element 22 pushes the airtight column 21 to resume its original position after the pressure drops. Thus, the end column 210 covers the air relief hole 202 again, and the pressure starts accumulating from the beginning again. The regulation of this effect can maintain the ratio of the water level and the food within a normal range continuously to discharge the food material or soup to the containing trough 120 at the top of the lid 12. To prevent liquid, gas and food from spilling out during the pressure relief process, a bevel 230 is defined at the inner wall of the gravity valve 23, and a buffer portion 232 is extended inwardly from an end of the gravity valve 23. If liquid, gas or food spills, they will slide down along the bevel 230. While sliding down, the liquid, gas and food is buffered by the buffer portion 232 to prevent them from being spilled over messily.

Compared with the conventional air relief valve structure of a pressure cooker, the pressure cooker of the present invention can achieve the effect of discharging food debris by the air relief hole with a greater diameter (which is equal to the width of the end column) to relieve pressure quickly.

While the invention has been described by means of specific embodiments, numerous modifications and variations could be made thereto by those skilled in the art without departing from the scope and spirit of the invention set forth in the claims.

What is claimed is:

1. An air relief valve structure of a pressure cooker, with the pressure cooker including a cooker body and a lid covered onto the cooker body, with the lid including a containing trough and an air relief valve installed at the containing trough, and with the air relief valve comprising:
   a middle column having a containing space formed therein, and at least one air relief hole and a through hole formed on an outer wall of the middle column and interconnected with the containing space;
   an airtight column installed in the containing space and having an end column defined at an end of the airtight column and disposed adjacent to an inner wall of the middle column, with the end column having a diameter equal to a diameter of the containing space of the middle column;
   an elastic element sheathed on the airtight column and abutting the end column; and
   a gravity valve installed at the top of the middle column and coupled to the airtight column.

2. The air relief valve structure of a pressure cooker according to claim 1, further comprising a rubber ring sheathed on the end column and abutted against the inner wall of the middle column.

3. The air relief valve structure of a pressure cooker according to claim 1, wherein the gravity valve has a bevel defined on an inner wall of the gravity valve, with a buffer portion extended inwardly from an end of the gravity valve.

* * * * *